United States Patent
Kowles

(10) Patent No.: US 9,804,781 B2
(45) Date of Patent: Oct. 31, 2017

(54) STORAGE MEDIA PERFORMANCE MANAGEMENT

(71) Applicant: Seagate Technology LLC, Cupertino, CA (US)

(72) Inventor: Andrew Michael Kowles, Lyons, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 160 days.

(21) Appl. No.: 14/226,265

(22) Filed: Mar. 26, 2014

(65) Prior Publication Data
US 2015/0277761 A1 Oct. 1, 2015

(51) Int. Cl.
*G06F 3/06* (2006.01)

(52) U.S. Cl.
CPC .............. *G06F 3/061* (2013.01); *G06F 3/065* (2013.01); *G06F 3/068* (2013.01)

(58) Field of Classification Search
CPC ........... G06F 3/061; G06F 3/065; G06F 3/068
USPC .......................... 711/162, 112, 154, 156, 170
See application file for complete search history.

(56) References Cited

U.S. PATENT DOCUMENTS

| | | | | |
|---|---|---|---|---|
| 7,536,495 B2* | 5/2009 | Ashmore | ............ | G06F 11/2089 710/310 |
| 7,594,084 B2* | 9/2009 | Ikemoto | ................ | G06F 3/0605 711/112 |
| 7,653,847 B1 | 1/2010 | Liikanen et al. | | |
| 8,437,106 B2 | 5/2013 | Yanagisawa et al. | | |
| 8,473,466 B1* | 6/2013 | Milby | ............... | G06F 17/30306 707/694 |
| 8,661,184 B2* | 2/2014 | Wood | .................. | G06F 12/0246 711/100 |
| 8,683,222 B2* | 3/2014 | Yellepeddy | ............. | G06F 21/79 713/189 |
| 8,935,493 B1* | 1/2015 | Dolan | .................... | G06F 3/0649 711/117 |
| 8,977,804 B1* | 3/2015 | Horn | ................... | G06F 12/0871 711/103 |
| 2002/0118473 A1* | 8/2002 | Yong | .................... | G11B 5/4886 360/31 |
| 2004/0024796 A1* | 2/2004 | Takeda | .................. | G06F 11/008 |
| 2004/0190421 A1* | 9/2004 | Ozaki | ................ | G11B 20/1258 369/59.25 |
| 2004/0190422 A1* | 9/2004 | Ozaki | ................ | G11B 20/1258 369/59.25 |
| 2006/0112253 A1* | 5/2006 | Takeda | .................. | G06F 11/008 711/170 |
| 2006/0168447 A1* | 7/2006 | Pailles | ................. | G06Q 20/045 713/176 |
| 2006/0277226 A1* | 12/2006 | Chikusa | ............ | G06F 17/30067 707/E17.01 |
| 2008/0091952 A1* | 4/2008 | Sumner | ................. | H04L 63/064 713/185 |

(Continued)

FOREIGN PATENT DOCUMENTS

CN 101788938 A * 7/2010

*Primary Examiner* — Pierre-Michel Bataille
(74) *Attorney, Agent, or Firm* — Holzer Patel Drennan

(57) ABSTRACT

A method or system for determining a required certification level of storage area for storing data of a write request based on a characteristic of the data, selecting a target storage area based on a media certification table and the required determined certification level of the media area and storing data at the target storage area.

20 Claims, 6 Drawing Sheets

(56) References Cited

U.S. PATENT DOCUMENTS

| | | | |
|---|---|---|---|
| 2009/0310451 A1* | 12/2009 | Kim | G11B 20/18 369/47.14 |
| 2012/0278533 A1* | 11/2012 | Suzuki | G11C 16/3404 711/103 |
| 2013/0238834 A1* | 9/2013 | Feldman | G06F 3/0605 711/103 |
| 2013/0275479 A1* | 10/2013 | Thadikaran | G06F 17/30082 707/827 |
| 2014/0195759 A1* | 7/2014 | Gantman | G06F 3/0608 711/165 |

* cited by examiner

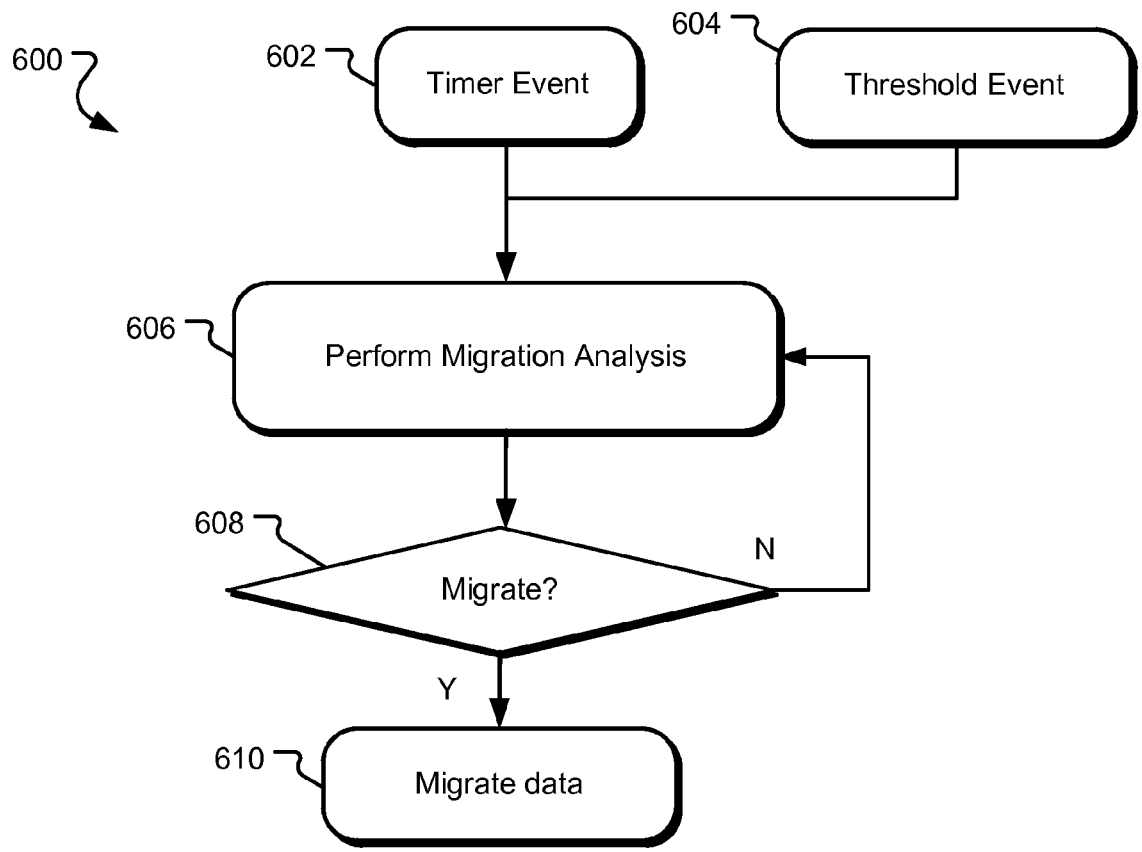
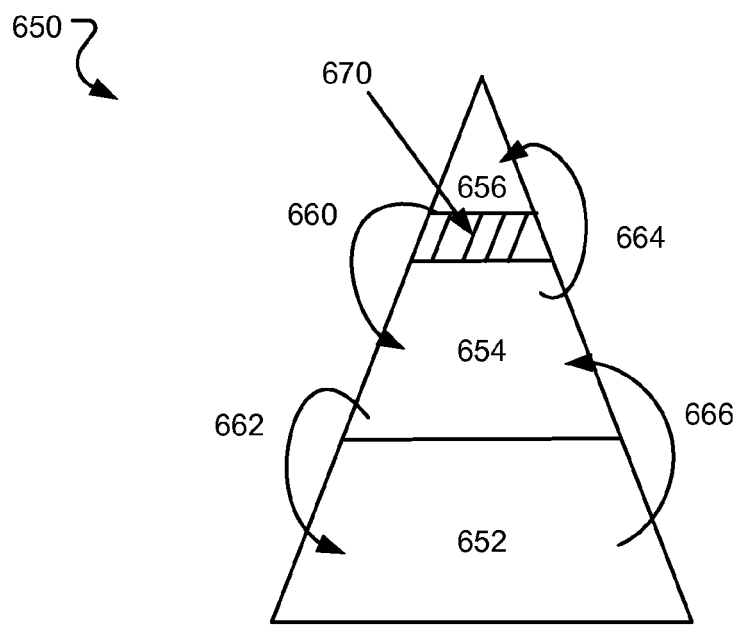
FIG. 6

STORAGE MEDIA PERFORMANCE MANAGEMENT

BACKGROUND

The requirements for data storage, retrieval, and analysis have increased along with the need for cheaper and faster data storage devices. Data storage devices, such as disc drives, solid state drives, solid state hybrid drives, etc., store data to various different recording media. This requires various non-volatile storage methods. Disc drives are widely used as data storage device in computing systems. To meet the increasing needs, disc drives providers have traditionally increased the capacity of the disc drives by increasing the density of recording on the disc drives. At the same time, given the vast amount of data being stored and processed by users as well as the competitiveness of the industry, storage device providers are under pressure to continue driving down the unit cost.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations and implementations as further illustrated in the accompanying drawings and defined in the appended claims.

A method or system for determining a required certification level of storage area for storing data of a write request based on a characteristic of the data, selecting a target storage area based on a media certification table and the required determined required certification level of the media area and storing data at the target storage area.

These and various other features and advantages will be apparent from a reading of the following detailed description.

BRIEF DESCRIPTIONS OF THE DRAWINGS

The described technology is best understood from the following Detailed Description describing various implementations read in connection with the accompanying drawings.

FIG. 1 discloses an example system that uses storage media with at least some sections that are partially certified.

FIG. 2 an example flowchart of operations for storing the data based on the read heat and the write heat of the data.

FIG. 6 illustrates an example flowchart for migrating data based on certification levels.

DETAILED DESCRIPTIONS

Figure 1:
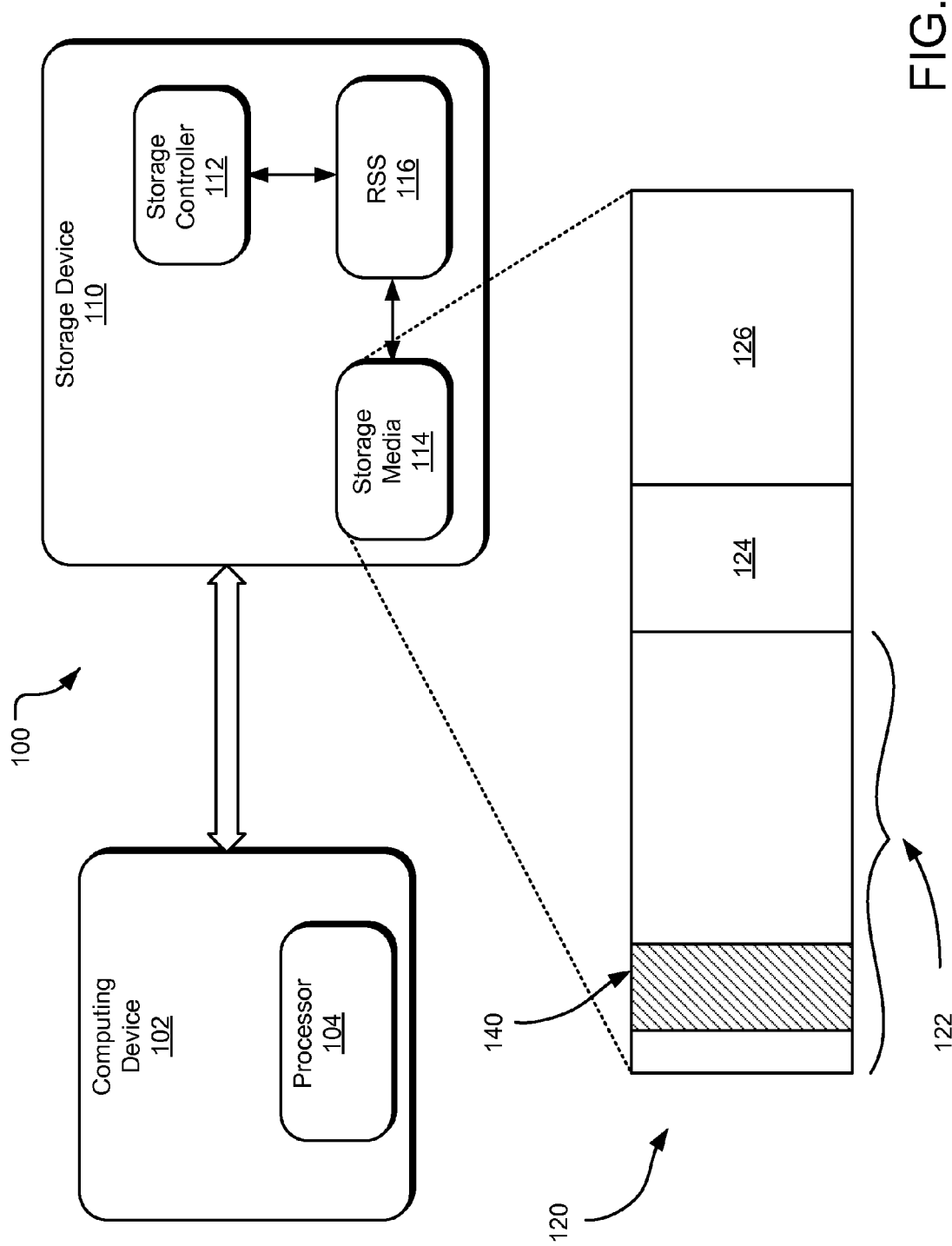

In the following description, for the purposes of explanation, numerous specific details are set forth in order to provide a thorough understanding of the various implementations described herein. While various features are ascribed to particular implementations, it should be appreciated that the features described with respect to one implementation may be incorporated with other implementations as well. By the same token, however, no single feature or features of any described implementation should be considered essential, as other implementations may omit such features.

As the requirements for data storage, retrieval, and analysis increases, the need for cheaper and faster data storage devices also increases. Disc drives are widely used as data storage devices for computing systems. Such data storage devices, including hard disc drives and solid state hybrid drives, store data on magnetic media, as well as optical media, solid state media such as NAND, NVRAM, Resistive RAM (ReRAM), Magnetic RAM (MRAM), Phase Change Memory (PCM), and other advanced and staid memory technologies. To meet the increasing need, data storage providers have to increase the size of the storage devices, as well as the density of the data on the various media. In some implementations, adding more heads and discs may increase the size of the storage devices, however, in other implementations the form factor size of the storage device is increased to achieve larger size. Substantially, every byte of storage capacity that the storage providers provide to their clients has a production cost attached thereto. For example, such cost may be specified in terms of dollars earned per terabytes. Generally, for disc drive providers and other storage capacity providers, it costs more to produce more storage capacity for a given density. However, given the competitive nature of the storage industry, the price that the storage providers can extract from their clients is limited by market forces. Therefore, the storage providers have incentive to reduce the unit production cost of storage as sold to their clients to increase their profit margin and stay competitive.

The production capacity of storage device manufacturers is inelastic and huge capital investments are needed to physically expand via new factories, therefore the storage device manufacturers have an incentive to maximize utilization of the existing factory capacity. In other words, storage device manufacturers are acutely interested in generating more storage capacity throughput per unit manufacturing space. One manner in which the storage device manufacturers can generate more storage capacity per unit manufacturing capacity (in terms of space, time, etc.) is to reduce the factory time required to produce unit storage capacity. For example, the storage device manufacturers are interested in reducing the factory time per production of 1 TB of storage capacity.

During production of storage media, and during assembly of the storage device, storage media is certified by the storage media manufacturers for a number of storage media physical properties. Such certification may involve multiple iterations of scanning the storage media for particle defects, manufacturing defects, abnormalities, etc. Such certification often takes a long time (increasing the factory time per TB produced), and of course as the total capacity produced per unit increases, the total certification process becomes commensurately longer per unit. As a result each drive consumes more factory bandwidth or factory throughput capacity.

Implementations disclosed herein provide for reducing the per unit factory time by reducing the time spent on certification of a given storage capacity (TB). Specifically, the implementations disclosed herein provide the storage media using partial certification (also known as finish-in-the-field) of the device capacity wherein a storage device is shipped to a client with less than the full capacity of the storage media having been fully being certified. In some implementations, different sections of the storage media are certified to different levels. Thus, for example, a first section of the storage media is certified at high certification level, a second section of the storage media is certified at a medium certification level, and a third section of the storage media is certified at a low certification level, etc. In some implementation, the certification level may be based on or related to the predictability with which the data can be read from or written to a given section of the storage media (for a given level of reliability). For example, if for a given storage section, the predictability (alternatively reliability, speed, etc.) of writing the data accurately is low, the given section may be given a "low" certification level. Other criteria used to determine the certification level may be the time to write data with given reliability, the time to read data with given reliability, etc.

In one implementation, the information about the level of certification of the different sections of the various storage media may be stored in a certification table (also referred to as media certification state table, media latency predictability table, media reliability table, etc.), which is also stored on the storage media. Such a certification table may be stored on the sections of the storage media that are certified at a very high level of predictability/reliability. Furthermore, such sections of highly certified media may also be used for storing other critical system metadata or data such as recording subsystem (RSS) data, etc.

FIG. 1 discloses an example system 100 that uses storage media with at least some sections that are partially certified. Specifically, the system 100 includes a computing device 102 having a processor 104 that is communicatively connected to a storage device 110. While the system 100 is illustrated to have the storage device 110 external to the computing device 102, in an alternative implementation, the storage device 110 may be internal to the computing device 102. The storage device 110 may be, for example, a magnetic disc drive, an optical disc drive, a flash drive, other solid state media such as NAND, NVRAM, resistive RAM, mRAM, phase change memory (PCM), solid state hybrid drives, etc. The storage device 110 includes a storage controller 112 and storage media 114.

The storage controller 112 is configured to receive storage commands from the computing device 102 and process the storage commands to read data from the storage media 114, write data to the storage media 114, control movement of a read/write head (if necessary), etc. The storage controller 112 is also configured to control various data flow and data migration operations, data caching operations, data steering operations, etc. For example, the storage controller 112 steers data between the host computing device 102 and the storage media 114, between the storage media 114 and one or more cache memories (not shown) external or internal to the storage device 110, etc. Furthermore, the storage controller 112 also generates and stores the mapping of the storage regions 122, 124, 126 to logical block addresses (LBAs). Specifically, the usable storage regions of the storage media 114 are mapped to the LBA space.

In one implementation, the storage media 114, shown here with an expanded view of a storage area 120, may be divided into a number of sections such that the certification levels of the various sections are different. Specifically, the storage area 120 is divided into a high certification section 122, a medium certification section 124, a low certification section 126, and an uncertified section (not shown). For example, during the manufacturing of the storage media 114, the sections of the storage media 114 represented by the high certification section 122 may be scanned and rescanned a number of times to ensure that the number of defects to the media is substantially predictable. On the other hand, the sections of the storage media 114 represented by the medium certification section 124 may be scanned relatively few times and as a result, the confidence level of the medium certification section 124 having no defects is low. Finally, the low certification section 126 may be scanned even less number of times. Note that while the illustrated implementation of the storage area 120 is divided into only three sections, in an alternative implementation, a more or less number of sections may be provided.

In one implementation of the storage device 110, the high certification section 122 further includes a certification table 140 that includes information about the certification level of various sections of the storage media 114. In one implementation, the certification table 140 is dynamically managed such that the certification level of various sections of the storage media 114 is updated in a dynamic manner during operation of the storage device 110. For example, if attempts to write data to or to read data from a particular storage section of the storage media 114 encounters a number of errors above a threshold, that particular section may be associated with a predetermined level of certification and information about such predetermined level of certification may be stored in the certification table 140 to be referenced for later use. Furthermore, the information stored in the certification table 140 may also be copied locally to the storage controller 112 for fast access.

In one implementation, the storage device 110 also includes a recording subsystem (RSS) section 116 that stores various recording subsystem data, which can be used by the storage controller 112 to reference the storage media 114. For example, such data stored in the RSS may include at what fly height a recording head of the storage device needs to be operated, how to manage a seek operation, whether defects exists on the storage media, the location of such defects, etc. The RSS 116 may be in the form of hardware, firmware, or software stored on the storage controller 112. In one implementation, the manufacturer of the media provides the RSS data and it is supplemented dynamically with other data, such as the data from the certification table 140, or other metadata from the storage controller 112. Furthermore, the RSS data may also be stored on the storage media 114.

In one implementation, the storage controller 112 analyzes various requests received from the host computing device 102 and supplants this with the data from the certification table 140 to determine how to best serve the request. For example, the storage controller 112 may review the data properties of a write request to determine the desired level of certification of the sections where the data is to be stored. Thus, if the computing device 102 sends a write request for writing data with high data heat, the storage controller 112 writes such data to the high certification region 122. The data heat may be determined, for example, based on the number of access requests made to certain part of the storage media per unit time, as determined by the LBA of the requests.

As an example, if a particular LBA block has received a large number of read requests in a predetermined time period, the data that is directed to those sections, and any proximal data, may be assigned a high read heat level. In such a case, the data with high read heat is directed to storage sections with high read certification level. Conversely, if a request to an LBA is rare, the storage controller 112 ascertains it to be cold data region and data for write requests directed to such LBA is directed to storage sections with low certification. Similarly, data with high write heat level may be directed to storage sections with high write certification level, etc. Furthermore, some storage sections may be determined for both the read certification level and the write certification level. The information about the read certification levels and the write certification levels may be stored in a media certification table.

Furthermore, the certification level of the target storage section may also be chosen/determined based on the data reliability requirements, compressibility, or other characteristics of the data. Thus, for example, if the computing device 102 sends a write request for writing data that can tolerate some loss, such as video data, high resolution image data, etc., such data may be stored in the medium certification region 124, or even to the low certification region 126.

Yet alternatively, the storage controller 112 determines whether to mirror the data it is storing on a given section of the storage media 114 based on the known characteristics of the data and/or the certification level of the target storage section. Thus, if the storage controller determines that there is no space available in the high certification section 122 and it has to write some data with a high level of perceived importance to the medium or low certification section 124, the storage controller 112 may also mirror the data at some other location on the storage device 110, such a cache, or to another location that is off the storage device 110. In one implementation, the destination where the mirror data is stored has high certification level for reliability.

Furthermore, the certification of various data sections on the storage media 114 may also be determined based on the type of operation. For example, some sections of the storage media 114 may have high certification level for writing data where data can be written with high level of predictability. On the other hand, the same sections may have low read predictability, possibly persistent, resulting in predictability low, or low predictability, performance when reading data. Specifically, sections having low predictability are sections that been incompletely certified or never certified. On the other hand, sections having predictably low performance have been at least minimally certified or have had its certification process truncated or limited for various reasons and for which no additional certification is planned. As a result, such predictably low performance may be persistent for a long time, even forever in some circumstances.

The certification table 140 may maintain the certification information for both read certification and the write certification. In such a case, the storage controller 112 may use such operation specific certification information to direct read and write operations. For example, data directed to a read hot LBAs that is read often may be stored in storage sections with high level of read certification. On the other hand, data directed to write hot LBAs that is written to often is directed to storage sections with high level of write certification.

Figure 2:
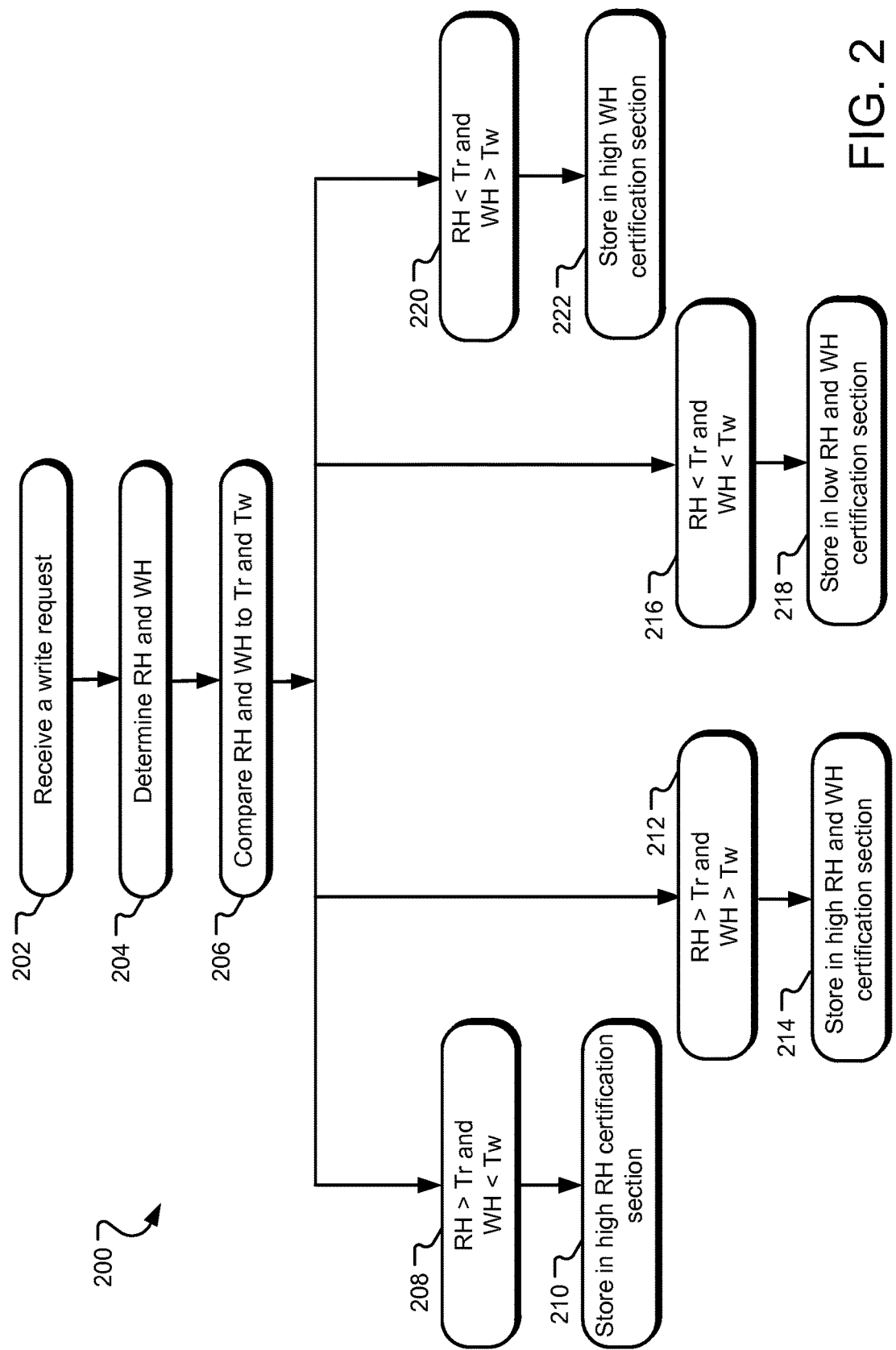

FIG. 2 an example flowchart 200 of operations for storing the data based on the read heat (RH) and the write heat (WH) of the data. The operations of the flowchart 200 may be implemented, for example, on a storage controller of a storage device. An operation 202 receives a write request, such as a write request received at a storage controller from a host computing device. The write request may specify the LBA of the write data attached to the write request or alternatively, the storage controller may determine the LBA of the write data. An operation 204 determines the read heat and the write heat of the write data. For example, based on the LBA of the write data, the storage controller may determine the read heat of the write data to be high if there has been a lot of read request to the LBA. Similarly, the storage controller may also determine the write heat based on the number of write requests to the LBA.

An operation 206 compares the read heat and the write heat of the write data to a read heat threshold (Tr) and a write heat threshold (Tw). Note that while the implementation of the flowchart 200 discloses comparison to only one threshold for each read heat and the write heat, in alternative implementation, a number of heat levels may be used to determine the storage location for the data. As illustrated by 208, if the read heat is above the read heat threshold and the write heat is below the write heat threshold, the write data is stored to a section with high read heat predictability at operation 210. On the other hand, if both the read heat is above the read heat threshold and the write heat is above the write heat threshold (212), the write data is stored to a section with high read heat and write heat certification at operation 214. Similarly, if both the read heat is below the read heat threshold and the write heat is below the write heat threshold (216), the write data is stored to a section with low read heat and write heat certification at operation 218. Finally, as illustrated by 220, if the read heat is below the read heat threshold and the write heat is above the write heat threshold, the write data is stored to a section with high write heat certification at operation 222.

Figure 3:
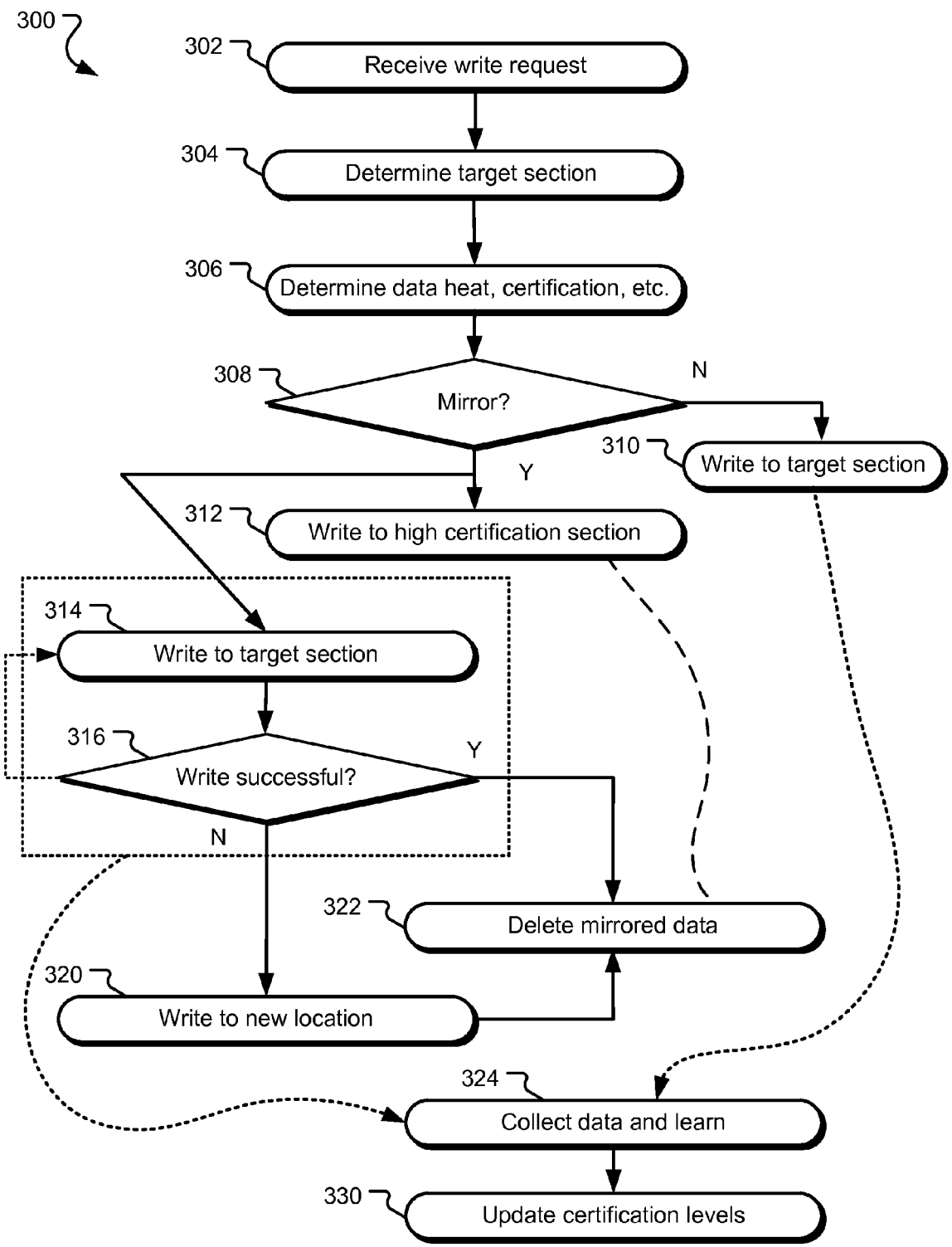
FIG. 3 illustrates an example flowchart of operations mirroring data based on the certification level of a target storage location.

FIG. 3 illustrates an example flowchart 300 of operations mirroring data based on the certification level of a target storage location. An operation 302 receives a write request, such as a write request received at a storage controller from a host computing device. The write request may specify the LBA of the write data attached to the write request or alternatively, the storage controller may determine the LBA of the write data. An operation 304 determines the target location where the write data from the request is stored. A storage controller may use a table providing mapping of LBA to physical storage locations to determine the target location where the data is to be stored.

An operation 306 determines values or weights related to various data properties. The determined values or weights are used by the storage controller to determine whether the write data should be mirrored or not. Such controller criteria may incorporate information such as the data heat, data compression levels, and other properties of the data, the certification levels of the available target storage location(s), workload rating, etc. For example, the workload rating may be similar to the "duty cycle" and can be qualitatively stated as the amount of data moved to a location over lifetime of a drive, the amount of data moved to a location per day, etc.

A determining operation 308 uses the metadata generated at the operation 306 to determine whether the write data is to be mirrored. For example, the storage controller may use a criteria where weights are given to the data heat levels and the certification levels and if the mirroring score calculated using a weighted combination of such values is above a threshold, the write data is mirrored. For example, if the data heat level is high and the certification level of the target storage location is low, the write data is mirrored.

If it is determined that the data is not to be mirrored, an operation 310 stores the data at the target location. On the other hand, if it is determined that the data is to be mirrored, an operation 312 stores the data at a location with high certification level as mirrored data and concurrently to a NAND, etc. Alternatively, the operation 312 may also mirror the data in other locations such as a cache, etc. Furthermore, another operation 314 writes the data to the target location. If the target location has a lower certification level, it may require more than one attempts to write data to the target location. Thus, a determining operation 316 determines whether the write operation was successful. If the write operation is not successful more attempts may be made to store the data at the target location. Once it is determined that the write operation was successful, an operation 322 deletes the mirrored data, which, in this case may be stored at a high certification section, a cache, etc. If the write operation is not successful after a predetermined number of attempts, an operation 320 writes the data to a new location, in which case, the mirrored data is unmapped.

An operation 324 collects the data related to the number of attempts required to store the data at the target location, the success rate for these attempts, etc. The operation 324 may also include a learning mechanism that determines and stores the current certification level of the target storage location based on the number of attempts. Furthermore, the operation 324 may also collect data from other operations related to the target storage location, such as the number of attempts to read data from the target storage location, etc., that may be used to determine the certification level of the target storage location. Subsequently, an operation 330 updates a certification table with the updated certification information, which may be used for subsequent access to the media.

Figure 4:
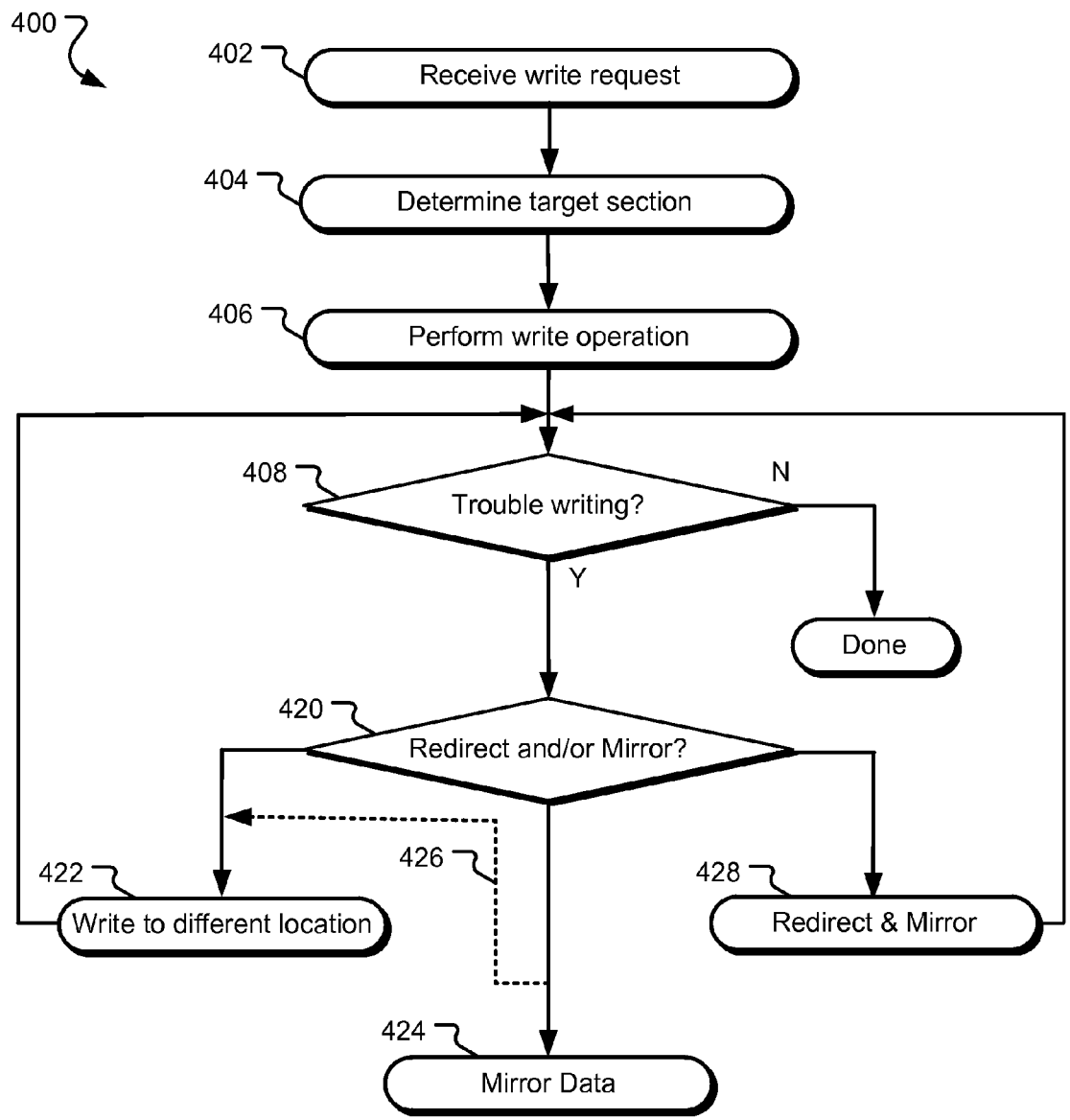
FIG. 4 illustrates an example flowchart for mirroring data or redirecting data to a new storage location.

FIG. 4 illustrates an example flowchart 400 for mirroring data or redirecting data storage to a new storage location. An operation 402 receives a write request, such as a write request received at a storage controller from a host computing device. The write request may specify the LBA of the write data attached to the write request or alternatively, the storage controller may determine the LBA of the write data. An operation 404 determines the target location where the write data from the request is stored. A storage controller may use a table providing mapping of LBA to physical storage locations to determine the target location where the data is to be stored.

An operation 406 performs a write operation based on the target location. Such as write operation may be a normal write operation or a dynamic write operation, etc. In one implementation, the operation 406 issues more than one concurrent write operation, each write operation directed to a different section of media. For example, the number of concurrent write operations initiated by the operation 406 may depend on data heat or other data property. Processing of such concurrent write operations is further described below in FIG. 5.

An operation 408 determines if there are any issues with the write operation. Such issues or troubles may be due to finishedness of the target location, etc. If it is determined that there were no issues or troubles writing the data, the write operation is complete. However, if an issue is detected that prevents the write operation from completion, a determining operation 420 determines whether to redirect the write operation to a different location and/or to mirror the data.

If it is determined that the write operation is to be redirected, an operation 422 redirects the write to a different location. Such selection of new location may be based on the certification levels of different storage locations or it may be selected based on some other criteria. On the other hand, if it is decided that the data is to be mirrored, an operation 424 mirrors the data to a location that has higher level of certification or to some other location, such as storage controller cache, etc. Furthermore, in an alternative implementation, the determining operation 420 may decide to both direct the write operation to a new location and to mirror the data. For example, after the operation 424 for mirroring the data is completed, the storage controller may attempt to write the data to a different location, as illustrated by the line 426. Yet alternatively, the operation 420 may determine that the data is going to be redirected to a different location and mirrored, in which case, an operation 428 for such redirection and mirroring is performed.

Furthermore, a monitoring operation (not shown) may monitor the various operations, various writing attempts, etc., of the flowchart 400, collect data and learn from the operations to determine the certification level of various sections of the storage media. Such learning allows dynamic updating of the certification table as the storage drive is used in field.

Figure 5:
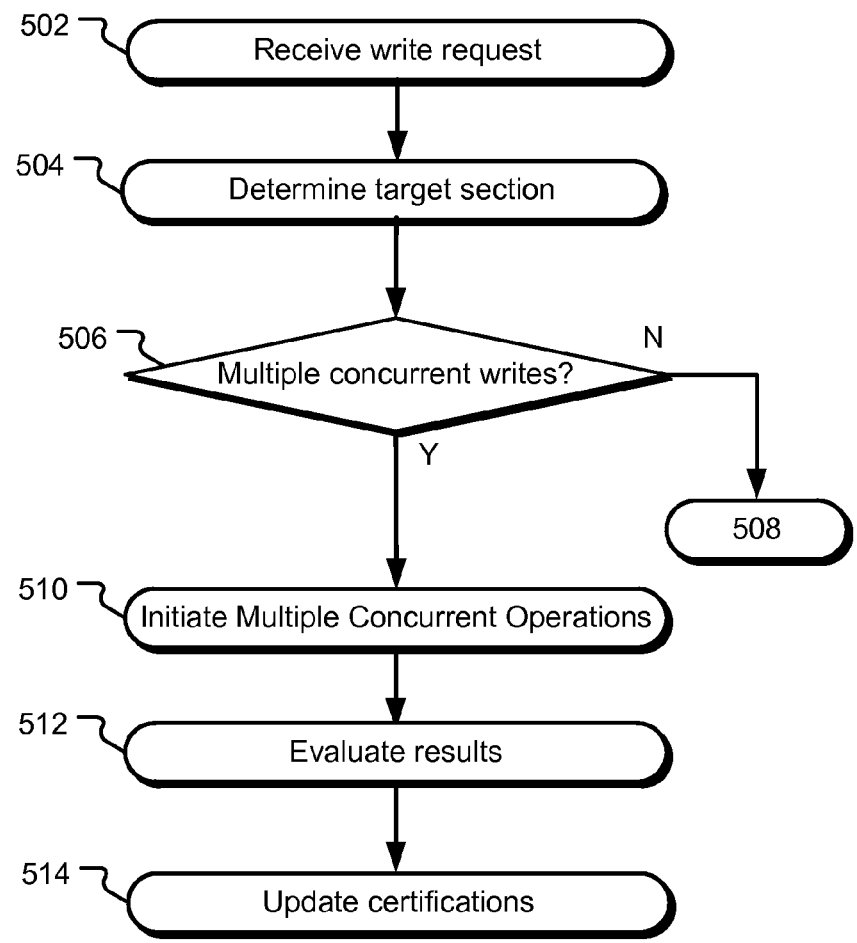
FIG. 5 illustrates an example flowchart for processing multiple concurrent, independently sortable, write operations.

FIG. 5 illustrates an example flowchart 500 for processing multiple write operations. An operation 502 receives a write request, such as a write request received at a storage controller from a host computing device. The write request may specify the LBA of the write data attached to the write request or alternatively, the storage controller may determine the LBA of the write data. An operation 504 determines the target location where the write data from the request is stored. A storage controller may use a table providing mapping of LBA to physical storage locations to determine the target location where the data is to be stored.

An operation 506 determines if multiple write operations are to be initiated. If it is determined that only one write operation is to be initiated, the control passes to the operation 508 (see operation 406, FIG. 4). Otherwise, an operation 510 initiates more than one concurrent write operations. Subsequently, an operation 512 compares the results of the write operations to determine which operation completed first. In such as case, once at least one of the multiple concurrent write operations is complete, the other operations are canceled. Furthermore, an operation 514 updates the certification levels for the various target sectors where the multiple concurrent operations are directed, based on the response time for completion of such operations.

FIG. 6 illustrates an example flowchart 600 for migrating data based on certification levels. Specifically, flowchart 600 illustrates migrating data between media sections 652, 654, 656 having different certification levels. For example, the section 656 may have very high certification level, the section 654 may have medium level of certification, and the section 652 may have a low level of certification. Note that FIG. 6 shows media certification chart 650 with only one certification level for each of the media sections 652, 654, 656, in alternative implementation, each section may have a read certification, a write certification, a read-write certification, etc.

The operations of the flowchart 600 migrates data between the various media sections 652, 654, 656 in response to a timer event 602 or a threshold event 604. Herein, the timer event indicates periodic monitoring and analysis. The result of either an event or timer period is possibly the migration of already-stored data to a new storage media location. The timer event 602 may be generated by a timer at predetermined time periods. On the other hand, the threshold event 604 may be, for example, a signal that indicates that the available space in the high certification area 656, as shown by the shaded section 670, is low. Other events may be, for example, indication of idle time for a storage controller, receiving of a large data-write request, etc. In response to the event from one of the timer event 602 and the threshold event 604, an operation 606 performs data migration analysis. Such analysis may involve, for example, evaluating usage levels of the various media sections 652, 654, 656, evaluating usage of the data stored in these sections, etc. For example, the threshold event 604 may determine that certain data stored in the high certification level section 656 has not been used for a while, indicating low read heat for the data and it may designate such data for transfer to a section with lower certification level than the certification level of section 656. Alternatively, the analysis operation 606 may decide that certain data stored in the low certification section 652 has been modified a high number of times and therefore, such data may be marked for migration to the high certification section 656.

Subsequently, an operation 608 determines if any data migration is to be performed. If such data migrations are to be performed, migration operation such as 660-666 may be performed by an operation 610. For example, migration 660 may be migration of data from high certification level section 656 to medium certification level section 654, migration 666 may be migration of data from low certification level section 652 to medium certification level section 654, etc.

The implementations described herein may be implemented as logical steps in one or more computer systems. The logical operations of the various implementations described herein are implemented (1) as a sequence of processor-implemented steps executing in one or more computer systems and (2) as interconnected machine or circuit modules within one or more computer systems. The implementation is a matter of choice, dependent on the performance requirements of the computer system. Accordingly, the logical operations making up the implementations of the implementations described herein are referred to variously as operations, steps, objects, or modules. Furthermore, it should be understood that logical operations may be performed in any order, unless explicitly claimed otherwise or a specific order is inherently necessitated by the claim language.

In the interest of clarity, not all of the routine functions of the implementations described herein are shown and described. It will be appreciated that in the development of any such actual implementation, numerous implementation-specific decisions are made in order to achieve the developer's specific goals, such as compliance with application- and business-related constraints, and that those specific goals will vary from one implementation to another and from one developer to another.

The above specification, examples, and data provide a complete description of the structure and use of example implementations. Because many alternate implementations can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
   determining a required certification level of a section of a storage media for storing data of a write request based on a characteristic of the data with a storage controller on a storage device, wherein one or more sections of the storage media are partially certified;
   selecting a target storage location based on a media certification table and the determined required certification level; and
   storing data at the target storage location.

2. The method of claim 1, wherein determining the required certification level further comprises determining the required certification level based on heat of the data.

3. The method of claim 1, wherein the characteristic of the data is read heat of the data and the media certification table stores read certification levels for various sections of the storage media.

4. The method of claim 1, wherein the characteristic of the data is write heat of the data and the media certification table stores write certification levels for various sections of the storage media.

5. The method of claim 1, wherein the characteristic of the data is data compressibility.

6. The method of claim 1, further comprising determining if the data needs to be mirrored based on a certification level of the target storage location.

7. The method of claim 6, further comprising mirroring the data at an alternative storage location wherein the certification level of the alternative storage location is higher than the certification level of the target storage location, if it is determined that the data needs to be mirrored.

8. The method of claim 7, further comprising deleting the data from the alternative storage location if the data is successfully stored at the target storage location.

9. The method of claim 1, further comprising:
   monitoring the storing operation to collect latency data related to the storing operation at the target storage location; and
   updating the media certification table based on the collected latency data.

10. The method of claim 1, further comprising:
    migrating data based on the determined certification level.

11. A method comprising:
    determining, with a storage controller on a storage device, a write certification level of a target storage area based on latency of an operation to write data to the target storage area, wherein one or more sections of a storage media are partially certified.

12. The method of claim 11, further comprising storing a copy of the data to an alternative location, if the determined write certification level of the storage area is below a certification threshold.

13. The method of claim 11, further comprising determining data heat and storing a copy of the data to an alternative location, if the determined write certification level of the storage area is below a certification threshold and the data heat is above a data heat threshold.

14. The method of claim 11, further comprising updating a media certification table based on the determined write certification level of the target storage area.

15. The method of claim 11, further comprising determining a read certification level of a target storage area based on latency of an operation to read data from the target storage area.

16. The method of claim 14, further comprising updating a media certification table based on the determined read certification level of the target storage area.

17. A storage system comprising:
    a storage media, wherein one or more sections of the storage media are partially certified; and
    a storage controller configured to:
    receive a write request to write data,
    determining heat of the data, and
    determining a target storage location on the storage media for the data based on the heat of the data using a media certification table.

18. The storage system of claim 17, wherein the storage controller is further configured to determine a write heat of the data and a read heat of the data and wherein the media certification table stores write certification levels and read certification levels for various sections of the storage media.

19. The storage system of claim 17, wherein the storage controller is further configured to determine if the data is to be mirrored based on a certification level of the target storage location.

20. The storage system of claim 19, wherein the storage controller is further configured to determine if the data is to be mirrored based on the heat of the data.

\* \* \* \* \*